(12) United States Patent
Inada (10) Patent No.: US 8,520,173 B2
(45) Date of Patent: Aug. 27, 2013

(54) DISPLAY DEVICE (75) Inventor: Toshiya Inada, Hyogo (JP)

(73) Assignee: Chimei Innolux Corporation (TW)

(*) Notice: Subject to any disclaimer, the term of this patent is extended or adjusted under 35 U.S.C. 154(b) by 766 days.

(21) Appl. No.: 12/725,762

(22) Filed: Mar. 17, 2010

(65) Prior Publication Data

US 2010/0253605 A1 Oct. 7, 2010

(30) Foreign Application Priority Data

Apr. 1, 2009 (JP) ................... 2009-089062

(51) Int. Cl.
G02F 1/1333 (2006.01)
(52) U.S. Cl.
USPC .......................... 349/110; 349/147
(58) Field of Classification Search
None
See application file for complete search history.

(56) References Cited

U.S. PATENT DOCUMENTS

| 5,426,523 | A | * | 6/1995 | Shimada et al. | 349/111 |
|---|---|---|---|---|---|
| 5,668,649 | A | * | 9/1997 | Suzuki et al. | 349/42 |
| 5,847,781 | A | * | 12/1998 | Ono et al. | 349/44 |
| 5,959,706 | A | * | 9/1999 | Nagata et al. | 349/110 |
| 6,259,200 | B1 | * | 7/2001 | Morita et al. | 313/498 |
| 6,950,166 | B2 | * | 9/2005 | Kadotani | 349/141 |
| 7,110,068 | B2 | * | 9/2006 | Asuma et al. | 349/110 |
| 8,269,925 | B2 | * | 9/2012 | Ochiai et al. | 349/110 |
| 2002/0191132 | A1 | * | 12/2002 | Inada | 349/113 |

FOREIGN PATENT DOCUMENTS

| JP | 8-334753 | A | * | 12/1996 |
|---|---|---|---|---|
| JP | 09-211493 | | | 8/1997 |
| JP | 11-7044 | A | * | 1/1999 |
| JP | 2000047189 | | | 2/2000 |
| JP | 2000310795 | A | | 11/2000 |
| JP | 2001-242445 | A | * | 9/2001 |
| JP | 2003-140159 | A | * | 5/2003 |
| JP | 2004134356 | | | 4/2004 |
| JP | 2005283870 | | | 10/2005 |
| TW | 500961 | | | 9/2002 |

OTHER PUBLICATIONS

Office Action from corresponding JP application No. JP2009-089062.
Office Action dated Dec. 19, 2012 from corresponding application No. CN 201010126088.3.

* cited by examiner

Primary Examiner — Mike Stahl
(74) Attorney, Agent, or Firm — Lowe Hauptman & Ham, LLP (57) ABSTRACT A display device is provided, decreasing the influence of reflected incident/ambient light caused by patterned bus lines therein, wherein a backlight is disposed at a back side of a substrate comprising common electrodes and color filters, and images are viewed at a side of another substrate comprising pixel electrodes and thin film transistors. A layer (low-reflection layer) with an optical reflectivity lower than that of bus lines, is disposed in a buffer film formed between a viewing side of a glass substrate and an insulating film where the bus lines 4a are disposed. The low-reflection layer is patterned with the same shape as those of the bus lines and covers the bus lines. The incident/ambient light via the glass substrate is shielded by the low-reflection layer and does not arrive at the bus lines.

8 Claims, 10 Drawing Sheets

DISPLAY DEVICE

CROSS REFERENCE TO RELATED APPLICATIONS

This Application claims priority of Japan Patent Application No. 2009-089062, filed on Apr. 1, 2009, the entirety of which is incorporated by reference herein.

BACKGROUND OF THE INVENTION

1. Field of the Invention

The invention relates to a display device controlling luminance in every pixel thereof when performing image display, and more specifically to a display device comprising optical reflection suppressors which are advantageous to an image viewing mode, in which images are viewed from a side close to a substrate where pixel electrodes are disposed.

2. Description of the Related Art

Electronic devices, such as personal computers, and personal digital assistants (PDAs) etc., are widely used due to technological advances. Popularity of the electronic devices brings the need of portable electronic devices, which can be used in both offices and outdoors, wherein a reduced size and weight is preferred. Wide use of liquid crystal display (LCD) devices has assisted in making portable electronic devices popular.

LCD devices are roughly categorized into reflection type and transmission type LCD devices. For reflection type LCDs, incident light from the front of the liquid crystal panel is reflected by the backside of the liquid crystal panel, and images are viewed through the reflected light. For transmission type LCDs, images are viewed through transmission light from a backlight device located at the backside of the liquid crystal panel. Transmission type color LCDs utilizing color filters are typically used as display devices of personal computers displaying full color, of which, active matrix color LCDs utilizing controlling components such as thin film transistors (TFTs) are widely used.

The active matrix color LCD comprises a liquid crystal panel and backlight devices. The liquid crystal panel comprises a laminated structure of a polarizer film, a first glass substrate, a second glass substrate, and a polarizer film etc., wherein a liquid crystal layer is sealed between the two glass substrates which face to each other. The first substrate comprises common electrodes and color filters. The color filters are arranged in a matrix. The second substrate comprises pixel electrodes arranged in a matrix, and thin film transistors. The pixel electrodes are switched ON/OFF by the respective thin film transistors (TFTs). Optical transmittance in each pixel are controlled by signals from bus lines such as data bus lines, and gate bus lines etc., connected to TFTs to display images. Further, it is known that auxiliary capacitors are provided for every pixel to provide satisfactory amounts of electric charges to drive the liquid crystal. The backlight device is disposed at the backside of the liquid crystal panel, and comprises light emitting diodes (LEDs) emitting white light, and a light guide plate propagating light from the light emitting diodes and diffusing light to a side close to the liquid crystal panel.

[Prior Art(s)]
[Patent Reference(s)]
[Patent reference 1] JP2000-310795 (Japanese Patent Pre-grant Publication)

BRIEF SUMMARY OF THE INVENTION

A color liquid crystal display (LCD) device is typically composed of a structure which has a backlight device disposed at a backside of (underlying) a glass substrate (array substrate) comprising pixel electrodes and thin film transistors, and images are viewed at a side close to a glass substrate (may also be referred to as a "color filter substrate") comprising common electrodes and color filters (hereafter referred to as a "first viewing mode").

Figure 9:
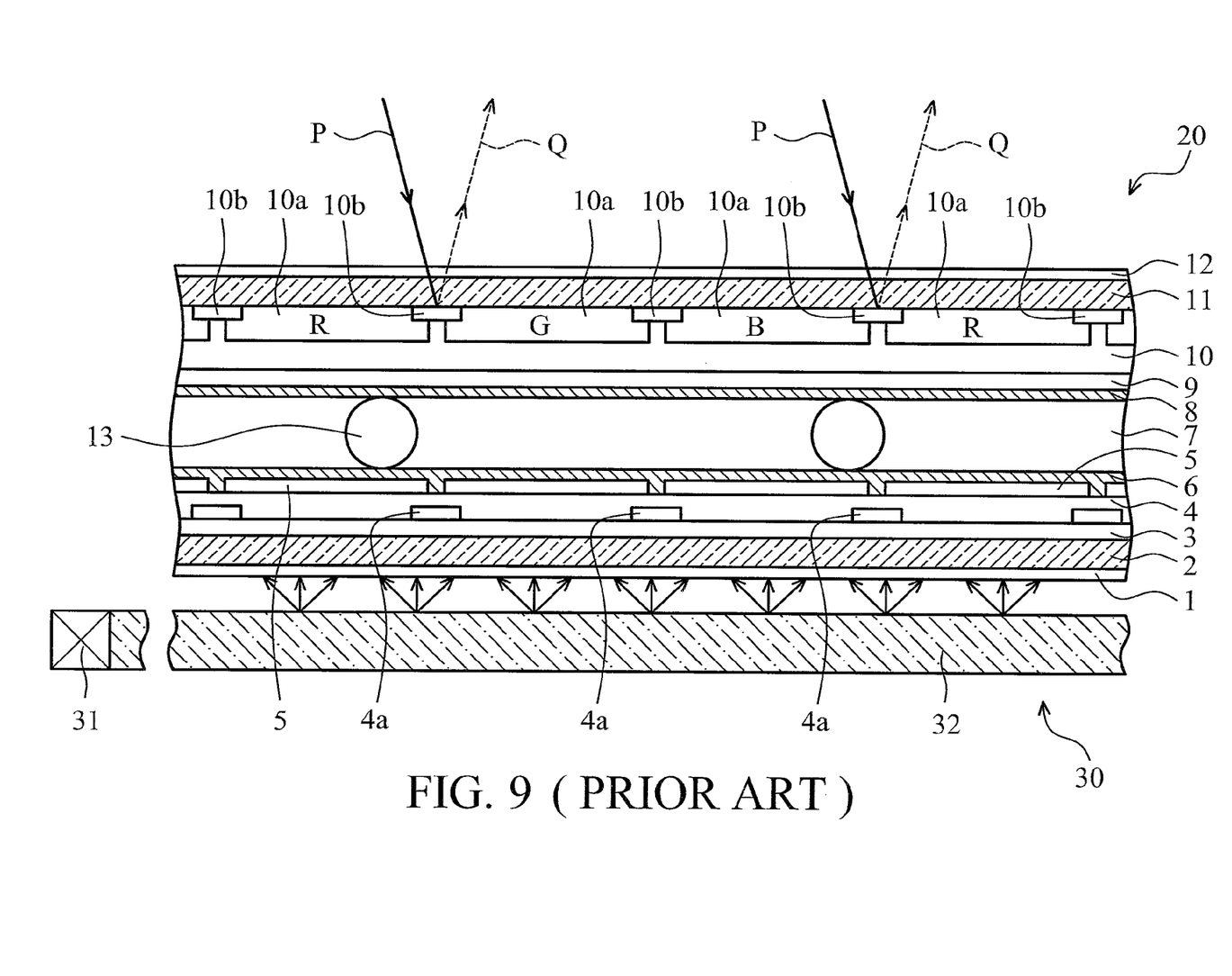
FIG. 9 shows a cross-sectional view of a conventional LCD device representing a first viewing structure.

FIG. 9 is a cross-sectional view showing a structure of a conventional LCD device of the first viewing mode. The LCD device comprises a liquid crystal panel 20 and a backlight device 30. The liquid crystal panel 20 comprises a polarizer film 12, a glass substrate (color filter substrate) 11, an insulating film 10 where color filters 10a and a black matrix (BM) 10b are disposed, common electrodes 9, an alignment film 8, a liquid crystal layer 7, an alignment film 6, pixel electrodes 5, an insulating film 4 where thin film transistors and bus lines 4a are disposed, a buffer film 3, a glass substrate (array substrate) 2, and a polarizer film 1 sequentially laminated from a front (upper layer) side to a back (lower layer) side thereof. Spacers 13 are disposed in the liquid crystal layer 7. The backlight device 30 is disposed at a backside of the liquid crystal panel 20 (backside of the glass substrate (array) substrate 2), and comprises light emitting diodes 31 and a light guide plate 32.

Additionally, a known structure having a backlight device disposed at a backside of (underlying) a glass substrate (color filter substrate) comprises common electrodes and color filters, and images are viewed at a side close to a glass substrate (may also be referred to as a "array substrate") comprising pixel electrodes and thin film transistors (hereafter referred to as a "second viewing mode"). The second viewing structure is arranged opposite to the first viewing structure.

Figure 10:
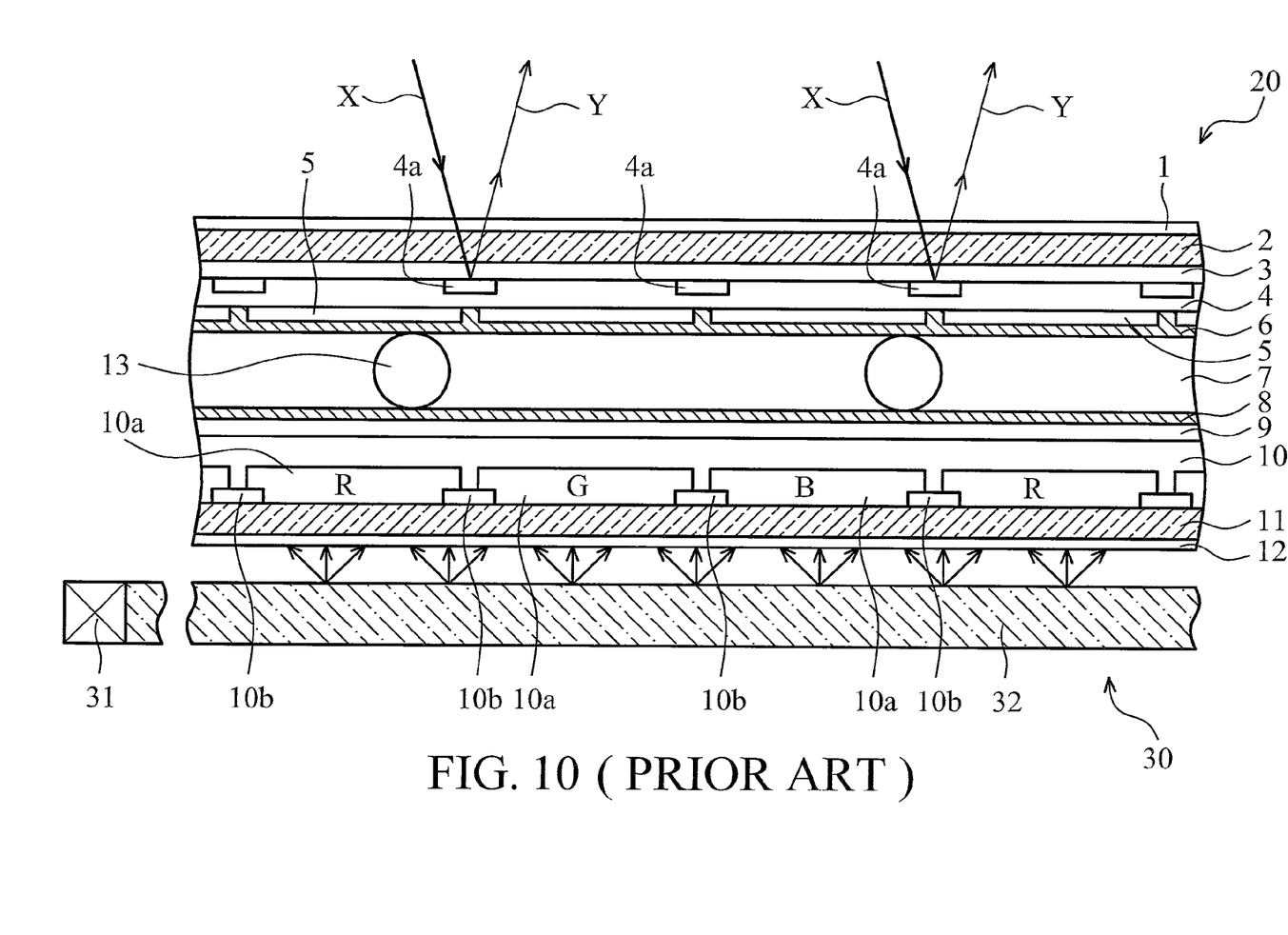
FIG. 10 shows a cross-sectional view of a conventional LCD device representing a second viewing structure.

FIG. 10 is a cross-sectional view showing a structure of a conventional LCD device of the second viewing mode. The LCD device comprises a liquid crystal panel 20 and a backlight device 30. The liquid crystal panel 20 comprises a polarizer film 1, a glass substrate (array substrate) 2, a buffer film 3, an insulating film 4 where thin film transistors and bus lines 4a are disposed, pixel electrodes 5, an alignment film 6, a liquid crystal layer 7, an alignment film 8, common electrodes 9, an insulating film 10 where color filters 10a and a black matrix (BM) 10b are disposed, a glass substrate (color filter substrate) 11, and a polarizer film 12 sequentially laminated from a front (upper layer) side to a back (lower layer) side thereof Spacers 13 are disposed in the liquid crystal layer 7. The backlight device 30 is disposed at a backside of the liquid crystal panel 20 (backside of the glass substrate (color filter) substrate 11), and comprises light emitting diodes 31 and a light guide plate 32.

The advantages of the second viewing structure are listed below. When illumination of the backlight device 30 (light emitting diodes 31) of an avionics LCD device is large, light from the backlight device 30 may cause miss operation of the thin film transistors. However, light from the backlight device 30 is shielded by the black matrix 10B in the structure where the backlight 30 is disposed at a backside of (underlying) the glass substrate (color filter substrate) 11 comprising the common electrodes 9 and the color filters 10a. Note that theoretically, light reflected by the black matrix 10b is reflected by the polarizer film 12, and then passes the apertures. However, light reflected by the black matrix 10b becomes circularly polarized light, and thus, most of the light is absorbed by the polarizer film 12. Therefore, it is difficult to bring the miss operation of the thin film transistors caused by large illumination.

Further, the second viewing mode is appropriate for application in a bottom-emission organic light emitting diode (OLED). In the bottom-emission OLED, image light is emitted from an array substrate, and images are viewed at a side close to the array substrate side.

However, the second viewing mode also has some disadvantages when compared to the first viewing mode. For example, for the first viewing mode, when incident/ambient light, during outdoor use, projects to the front side (upper side) of the liquid crystal panel 20 (the solid arrow P in FIG. 9), the reflected light thereof is shielded by the black matrix 10b with low optical reflectivity. Thus, the influence due to the reflected light is low (the dashed arrow Q in FIG. 9). Meanwhile, in the second viewing mode, the bus lines 4a are visible at the front side (upper side) of the liquid crystal panel 30. The bus lines 4a are typically made of metals with high optical reflectivity (Aluminum alloys etc., for example) for lower resistivity. Thus, when the incident/ambient light is projected to the front side (upper side) of the liquid crystal panel 30 (the solid arrow X in FIG. 10) in outdoor, the incident light is reflected by the surfaces of bus lines 4a to the viewing side of the liquid crystal panel 30 (the solid arrow Y in FIG. 10). The reflected light causes low contrast for displaying images.

Accordingly, it is acknowledged that there are two methods for solving the disadvantages of the second viewing mode. The first method is lamination of an optical film capable of suppression of surface reflection of incident light. For example, a circular polarizer is one of the effective components for suppressing surface reflection. The second method is change of bus line materials to materials with low optically reflective properties.

However, regarding the first method, the luminance of the display device using the optical film is decreased due to low optical transmittance property (optical transmittance of the circular polarizer is about 40%) of the optical film. Meanwhile, regarding the second method, metals with low optically reflective properties basically have high electrical resist properties as shown in the Drude model. Thus, the electrical resist of the bus lines is high when selecting metals with low optical reflection. As a result, the display properties (such as display uniformity, and luminance properties due to low aperture rate etc., for example) are poor.

Thus, an embodiment of the present invention provides a display device capable of providing excellent display properties such as high contrast property, and high luminance property etc. for the second viewing mode, due to disposition of a layer with lower optical reflectivity than that of the bus lines covered thereby.

An embodiment of the invention provides a display device comprising a control component, a bus line for operating the control component, and a low-reflection layer. The control component is corresponding to each of pixels to control luminance for displaying images. The low-reflection layer has an optical reflectivity lower than that of the bus line, and covers the bus line but does not cover the control component.

In the display device of the embodiment of the invention, the bus line is covered by a layer with an optical reflectivity lower than the bus line. As a result, the incident light from the front side of a display panel of the display device is reflected by the layer, and only a minimal amount of reflected light arrives at the viewing side. Thus, the display device is minimally affected by the incident/ambient light during outdoor utilization and luminance of the display device is not decreased due to the absent of a special optical film for suppressing the reflected light. Further, the electrical resist of the bus line does not increase because the material of the bus line is not changed. As a result, excellent display properties are achieved.

In an embodiment of the present invention, the display device further comprises a substrate with a control component and a bus line formed thereon, and a smoothing film for smoothing a surface of the substrate, wherein the low-reflection layer is formed at a side of the substrate close to the smoothing film.

In the display device of the embodiment of the invention, the low-reflection layer is formed at a side of the substrate close to the smoothing film for smoothing a surface of the substrate. As a result, suppression of reflected light due to the low-reflection layer can be surely achieved.

In a display device of an embodiment of the invention, the control component is a thin film transistor, and the bus line comprises at least one of a data bus line connected to the thin film transistor, a gate bus line connected to the thin film transistor, and a bus line for a storage capacitor.

In the display device of the embodiment of the invention, the low-reflection layer is disposed to cover at least one of a data bus line connected to the thin film transistor, a gate bus line connected to the thin film transistor, and a bus line for a storage capacitor. As a result, the influence of the reflected light from the bus lines is suppressed.

In a display device of an embodiment of the invention, the low-reflection layer is a metal film or a laminated film of a metal film and a metal oxide film.

In the display device of the embodiment of the invention, a metal film or a laminated film of a metal film and a metal oxide film is utilized as the low-reflection layer for decreasing the influence of the reflected light from the bus line.

In a display device of an embodiment of the invention, the low-reflection layer is a resin film.

In the display device of the embodiment of the invention, a resin film is utilized as the low-reflection layer to decrease the influence of the reflected light from the bus line. For example, a black resist resin in a black matrix can be utilized as the resin film.

In a display device of an embodiment of the invention, the low-reflection layer is a semiconductor film.

In the display device of the embodiment of the invention, a semiconductor film is utilized as the low-reflection layer to decrease the influence of the reflected light from the bus line. For example, extra processes for forming the low-reflection layer are not required because the same material as the control component (thin film transistor) can be utilized as the semiconductor film.

In an embodiment of the invention, the display device comprises a plurality of color filters arranged in a matrix, wherein a black matrix comprising light diffusing surfaces is disposed between neighboring color filters.

In the display device of the embodiment of the invention, light from the backlight device is scattered when reflected by the black matrix due to the light diffusing surfaces of the black matrix. Thus, the reflected light is not absorbed by the polarizer film, and is subsequently reflected, passes the apertures (color filter regions), and outputs to the viewing side. As a result, the optical transmittance of the panel is increased.

According to the display devices of the embodiments of the invention, the bus line is covered by a layer with an optical reflectivity lower than that of the bus line. Thus, even if the display devices are utilized outdoors and images are viewed at the array substrate side, the incident light from the environment is not reflected by the bus line to the viewing side, achieving excellent display properties.

Further, according to the display devices of the embodiments of the invention, the black matrix comprises a light diffusing surface. Thus, reflected light of the black matrix is scattered, not being absorbed by the polarizer film, and then reflected, passes the apertures (color filter regions), and outputs to viewing side, increasing optical transmittance of the panel.

Further scope of the applicability of the invention will become apparent from the detailed descriptions given hereinafter. It should be understood however, that the detailed descriptions and specific examples, while indicating preferred embodiments of the invention, are given by way of illustration only, as various changes and modifications within the spirit and scope of the invention will become apparent to those skilled in the Art from the detailed descriptions.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Note that the concepts and specific practice modes of the invention is described in detail by the embodiments and the attached drawings. In the drawings or description, similar elements are indicated by similar reference numerals and/or letters. Further, the element shape or thickness in the drawings can be expanded for simplification or convenience of indication. Moreover, elements which are not shown or described can be in every form known by those skilled in the art.

It is understood that the following disclosure provides many different embodiments, or examples, for implementing different features of the invention. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples.

Specific embodiments of the invention for a display device are described. It is noted that the concepts of the invention can be applied to any known or newly developed display device.

The display devices of embodiments of the invention are specifically described with reference to the drawings. The display devices are active matrix type liquid crystal display (LCD) devices comprising a plurality of pixels arranged in a matrix, and performing color display utilizing color filters. Further, the display devices are the second viewing structure (, wherein backlight devices are disposed at a backside of (underlying) glass substrates comprising common electrodes and color filters, and images are viewed at the sides closest to the glass substrates comprising pixel electrodes and thin film transistors).

The display devices of embodiments of the invention are utilized in electronic devices such as mobile phones, digital cameras, personal digital assistants (PDAs), personal computers, televisions, automobile displays, avionics displays, digital photo frames, and portable DVD players etc.

First Embodiment

Figure 1:
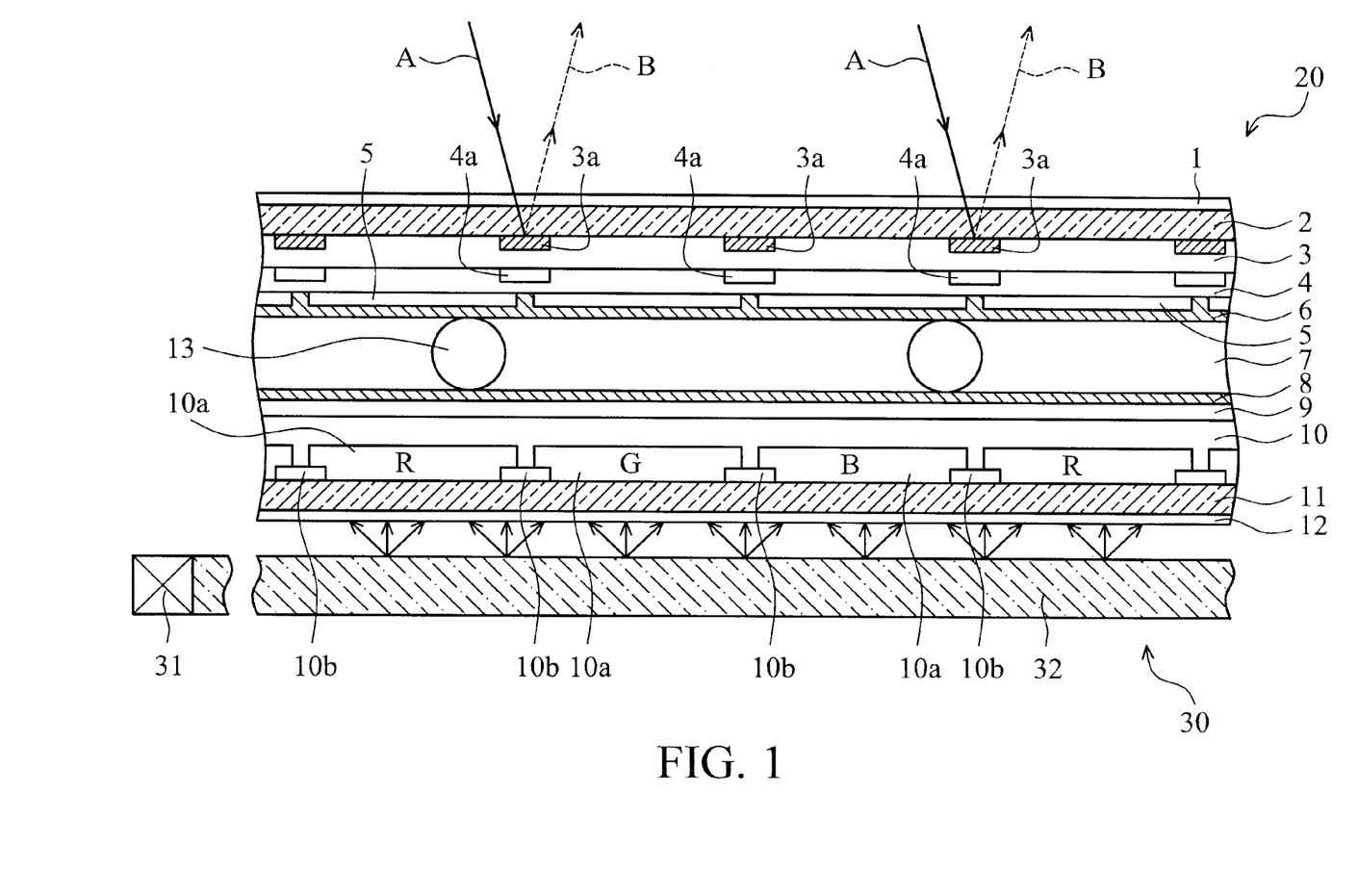
FIG. 1 shows a cross-sectional view of an LCD device of a first embodiment of the invention.

FIG. 1 shows a cross-sectional view of an LCD device of a first embodiment of the present invention. The LCD device comprises a liquid crystal panel 20 and a backlight device 30.

The liquid crystal panel 20 comprises a polarizer film 1, a glass substrate (array substrate) 2, a buffer film 3 where a layer 3a with low optical reflectivity (hereafter referred to as a "low-reflection layer 3a"), which is a characteristics of this embodiment of the invention, is disposed, an insulating film 4 where thin film transistors acting as control components and bus lines 4a are disposed, pixel electrodes 5 arranged in a matrix, an alignment film 6, a liquid crystal layer 7, an alignment film 8, common electrodes 9, an insulating film 10 where color filters 10a of R, G, B and a black matrix (BM) 10b are disposed, a glass substrate (color filter substrate) 11, and a polarizer film 12 sequentially laminated from a front (upper layer) side to a back (lower layer) side thereof.

The buffer film 3 acting as a smoothing film is an insulating film for smoothing a surface of the glass substrate 2, and comprises $SiO_x$, and $SiN_x$ etc., for example. When there is no buffer film 3, the wirings may be damaged due to fine scratches on the surface of the glass substrate 2, negatively affecting display properties.

The low-reflection layer 3a, patterned with the same shape as that of the bus lines 4a is formed overlying the front side (glass substrate 2 side) of the buffer film 3. The low-reflection layer 3a is fabricated by metals with lower optical reflectivity than that of the bus lines 4a. The bus lines 4a comprise data bus lines connected to the thin film transistors, gate bus lines connected to the thin film transistors, and bus lines for storage capacitors, and are fabricated by aluminum alloys. The low-reflection layer 3a is formed to cover the bus lines 4a but not to cover the thin film transistor. Further, the low-reflection layer 3a is not electrically connected to the bus lines 4a. The low-reflection layer 3a and the bus lines 4a are directly oppositely disposed with no connection therebetween. Thus, the situation that display properties of the LCD are affected by the capacitance component is not occurred.

The liquid crystal layer 7 is formed by filling of a liquid crystal material in the gap between the opposite alignment films 6 and 8 which are respectively polyimide films. The numerical reference "13" represents spacers for maintaining the thickness of the liquid crystal 7. The black matrix 10b acting as a light shielding pattern for increasing the contrast of the LCD device is disposed between the colored pixels of the color filters 10a. The black matrix 10b is formed by a black resist resin, for example.

The backlight device 30 is disposed at a backside of the liquid crystal panel 20, and comprises light emitting diodes 31 and a light guide plate 32. Wherein, the light emitting diodes 31 emit white light and the light guide plate 32 propagates and diffuses the light to the liquid crystal panel 20.

Figure 2A:
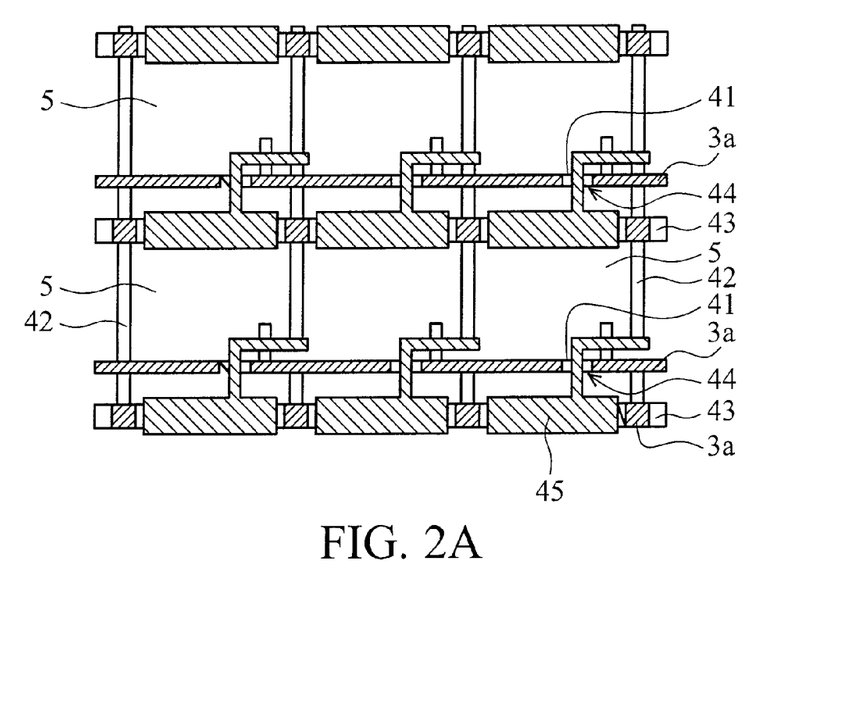
FIGS. 2A through 2C show typical drawings of physical relationships between the low-reflection layers and wiring patterns of the bus lines in the first and second embodiments of the invention.
Figure 2B:
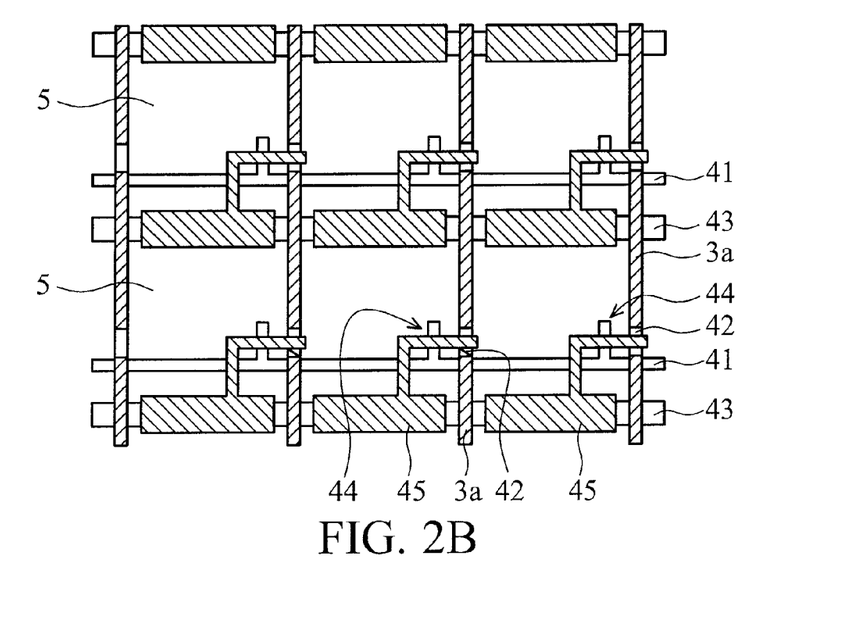
Figure 2C:
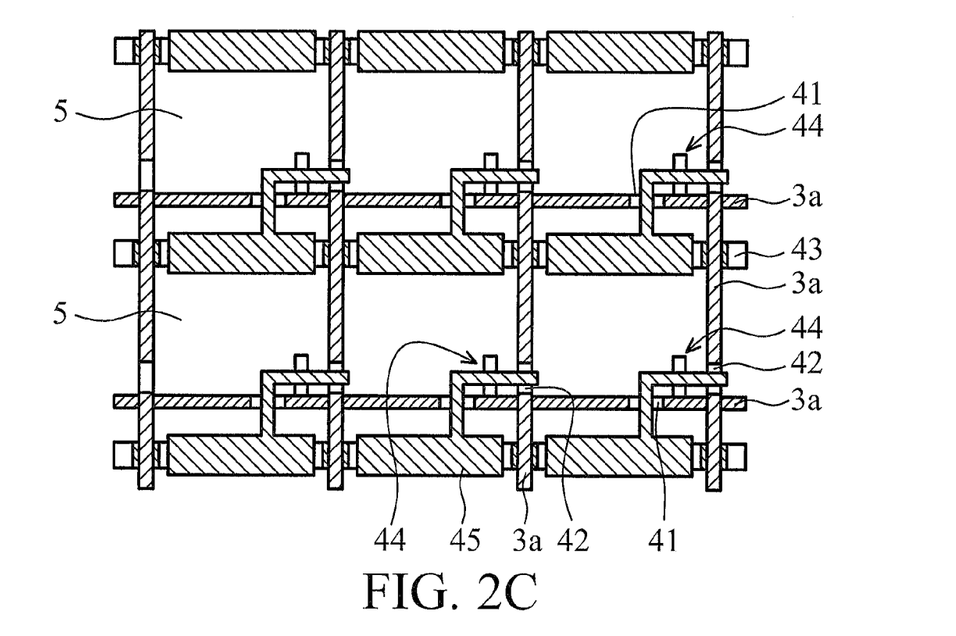
Figure 3:
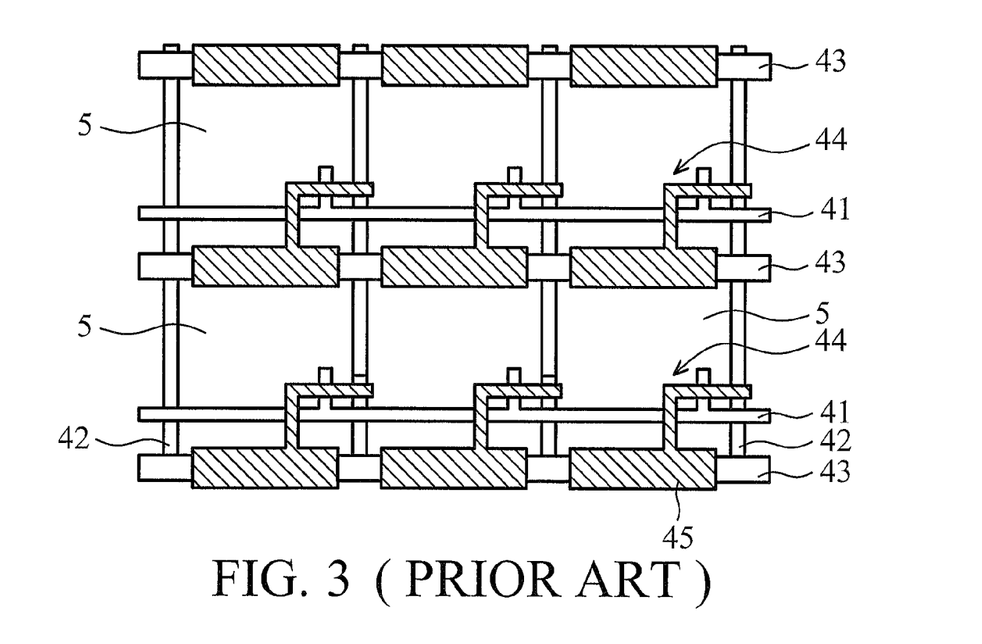
FIG. 3 show a typical drawing of a physical relationship between the low-reflection layer and a wiring pattern of the bus line in a conventional LCD device.

FIGS. 2A through 2C show layouts of physical relationships between the low-reflection layer 3a and a wiring pattern of the bus lines 4a in this embodiment of the invention. Compared thereto, a wiring pattern of bus lines in a conventional LCD device without the low-reflection layer 3a is shown in FIG. 3.

Referring to FIGS. 2A through 2C and 3, thin film transistors 44 fabricated by silicon treatment technologies are formed in every pixel electrode 5. The numerical references "41" and "42" respectively represent gate bus lines and data bus lines connected to the thin film transistors 44, and the numerical reference "43" represents bus lines for auxiliary capacitors (hereafter referred to as "capacitor bus lines"). The regions with coarse hatchings extending from the upper-left to lower-right direction of FIGS. 2A through 2C and 3 are polysilicon regions 45. Further, the regions with fine hatchings extending from the upper-right to lower-left direction of FIGS. 2A through 2C and 3 are formation regions of the low-reflection layer 3a.

The low-reflection layer 3a made of metal has the same shape as that of the bus lines 4a, and shields the bus lines 4a from incident light. The low-reflection layer 3a is preferably removed from the thin film transistor regions for the polymerization treatment performed by laser annealing. The removed regions comprise regions of auxiliary capacitors connected to gate bus lines 41 and/or capacitor bus lines 43.

FIG. 2A shows an example of the low-reflection layer 3a disposed to cover the gate bus lines 41 and the capacitor bus lines 43. The low-reflection layer 3a is disposed overlying the upper side (front side) of the gate bus lines 41 beyond the patterned polysilicon regions 45, and the capacitor bus lines 43.

FIG. 2B shows an example of the low-reflection layer 3a disposed to cover the data bus lines 42. The low-reflection layer 3a is disposed overlying the upper side (front side) of the data bus lines 42 beyond the patterned polysilicon regions 45.

FIG. 2C shows an example of the low-reflection layer 3a disposed to cover all of the bus lines 4a (the gate bus lines 41, the data bus lines 42, and the capacitor bus lines 43). The low-reflection layer 3a is disposed overlying the upper side (front side) of all of the bus lines 4a beyond the patterned polysilicon regions 45.

In the conventional LCD device, as described, when incident/ambient light enters from the front side of the liquid crystal panel 20 (the solid arrow X in FIG. 10) is reflected by the bus lines 4a, the reflected light is guided to the viewing side (the solid arrow Y in FIG. 10) of the liquid crystal panel 20. Thus, the viewing properties of the LCD device are deteriorated due to the reflected light.

As compared thereto, in the LCD device of the first embodiment comprising the compositions as described, when the incident/ambient light comes from the front side (upper side) (the solid arrow A in FIG. 1) of the liquid crystal panel 20, the incident/ambient light is shielded by the low-reflection layer 3a and does not arrive at the bus lines 4a because the low-reflection layer 3a is disposed overlying the bus lines 4a. Because the low-reflection layer 3a is formed by metals with low optical reflectivity, the reflected light reflected by the low-reflection layer 3a is minimal (the dashed arrow B in FIG. 1). Thus, viewing properties of the liquid crystal panel 20 is not affected by the reflected light.

Second Embodiment

Figure 4:
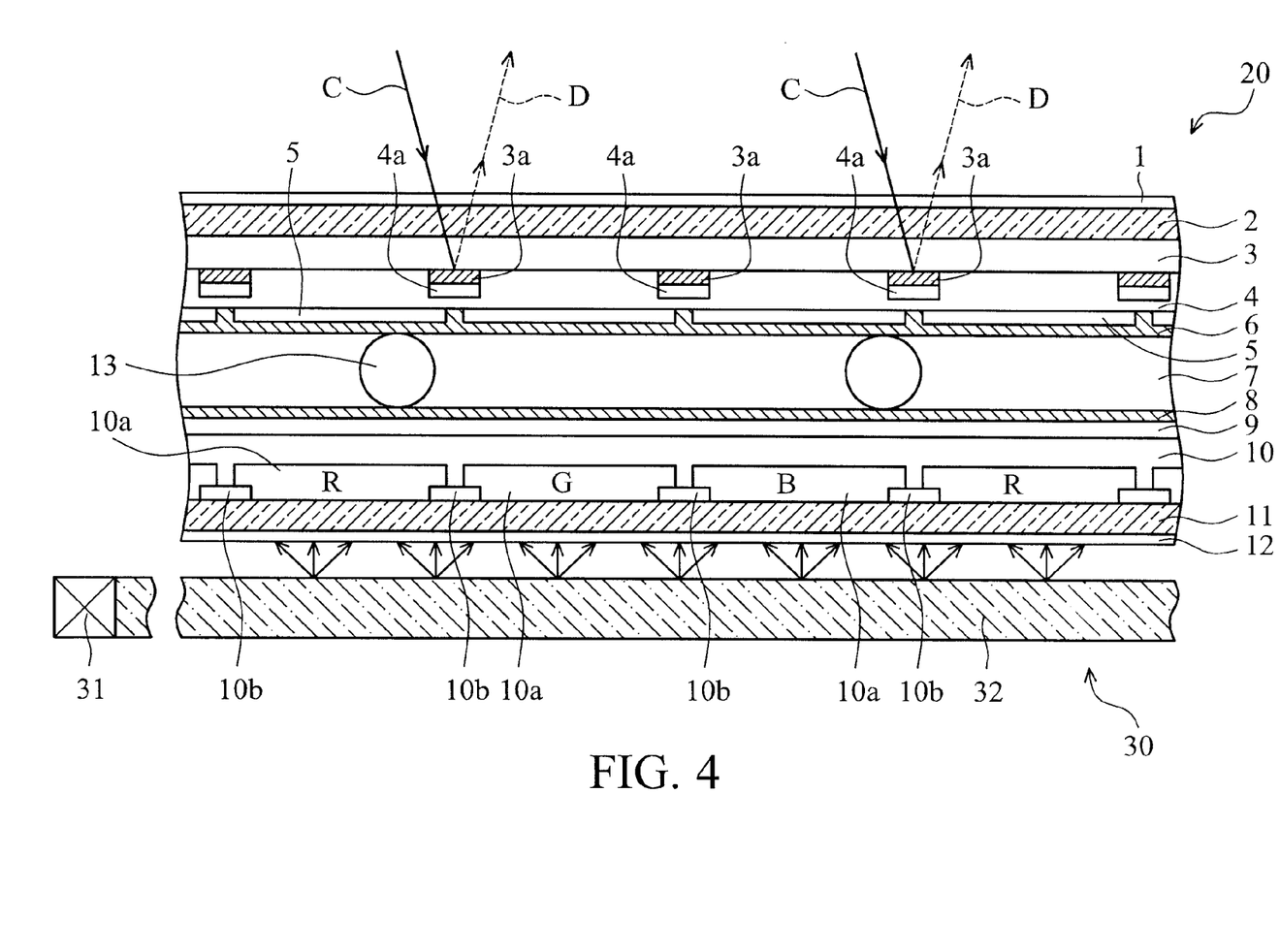
FIG. 4 shows a cross-sectional view of an LCD device of a second embodiment of the invention.

FIG. 4 shows a cross-sectional view of an LCD device of a second embodiment of the invention. In FIG. 4, the components which are the same as or similar with those shown in FIG. 1 are represented by the same reference numerals and/or letters, and the descriptions thereof are omitted herefrom.

In the first embodiment, the low-reflection layer 3a is disposed overlying the front side (glass substrate 2 side) of the buffer film 3. In the second embodiment, however, the low-reflection layer 3a patterned with the same shape as that of the bus lines 4a is formed overlying the back side (the lower surface side in FIG. 4) and covered by the insulating film 4 as shown in FIG. 4. The low-reflection layer 3a covers the bus lines 4a, but does not cover the thin film transistor formation regions, which is the same as the first embodiment. Further, the low-reflection layer 3a does not electrically connect to the bus lines 4a.

Still, the physical relationship between the low-reflection layer 3a and the wiring pattern of the bus lines 4a (the gate bus lines 41, the data bus lines 42, and the capacitor bus lines 43) in the second embodiment is the same as those of the descriptions for FIGS. 2A through 2C.

In the LCD device of the second embodiment, when the incident/ambient light enters from the front side of the liquid crystal panel 20 (the solid arrow C in FIG. 4), the incident/ambient light is shielded by the low-reflection layer 3a and does not arrive at the bus lines 4a because the low-reflection layer 3a is disposed overlying the bus lines 4a, which is similar to that of the first embodiment. Because the low-reflection layer 3a is formed by metals with low optical reflectivity, the reflected light reflected by the low-reflection layer 3a is minimal (the dashed arrow D in FIG. 4). Thus, the viewing properties of the liquid crystal panel 20 are not drastically affected due to the reflected light.

In the first and second embodiments, a metal film is used as the low-reflection layer 3a, but the invention is not limited thereto. The low-reflection layer 3a can be any film comprising a low optically reflective property, and also can be a laminate composition of a metal oxide film and a metal film. In this situation, lamination compositions of $CrO_x/Cr$ or $MoO_x/Mo$, for example, can be utilized. Further, the low-reflection layer 3a can be a resin film, and can also utilize a black resist resin in the black matrix 10b.

Third Embodiment

Figure 5:
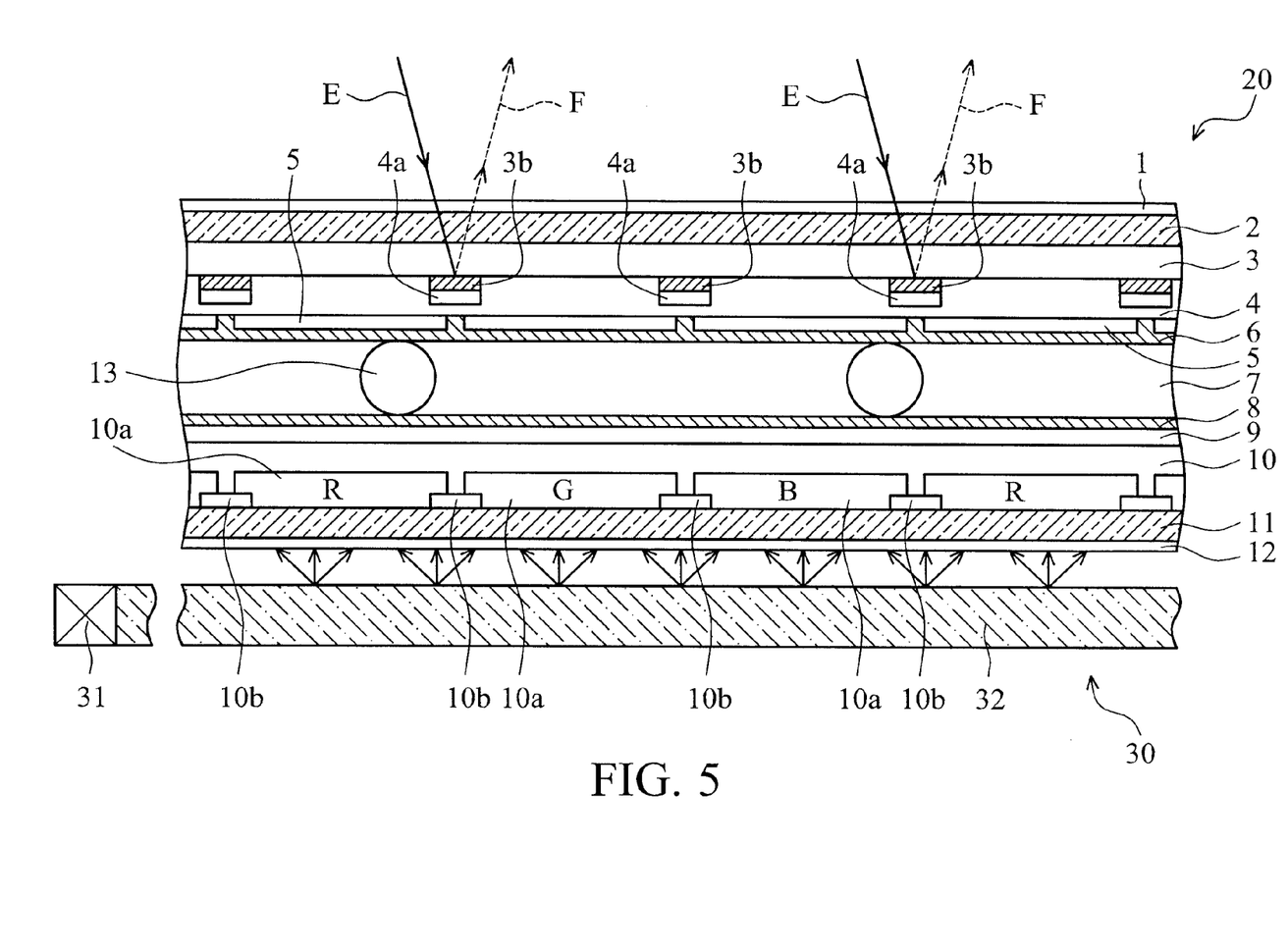
FIG. 5 shows a cross-sectional view of an LCD device of a third embodiment of the invention.

FIG. 5 shows a cross-sectional view of a LCD device of a third embodiment of the invention. In FIG. 5, the components which are the same as or similar with those shown in FIGS. 1 and 4 are represented by the same reference numerals and/or letters, and the descriptions thereof are omitted herefrom.

The third embodiment is an embodiment utilizing a semiconductor film as the low-reflection layer. In the third embodiment, the layer 3b with low optical reflectivity (hereafter referred to as a "low-reflection layer 3b"), which is a characteristic of this embodiment of the invention and patterned with the same shape as that of the bus lines 4a, is formed overlying the back side (the lower surface in FIG. 5) of the buffer film 3 and covered by the insulating film as shown in FIG. 5. The low-reflection layer 3b covers the bus lines 4a, but does not cover the thin film transistor formation regions, which is the same as the first and second embodiments. Further, the low-reflection layer 3*b*, with optical reflectivity lower than that of the bus lines 4*a*, does not electrically connect to the bus lines 4*a*.

In the third embodiment, the low-reflection layer 3*b* is formed by a silicon layer for fabricating the thin film transistors 44. Specifically, the low-reflection layer 3*b* is formed by the remaining silicon layer along the bus lines 4*a* when the thin film transistors 44 are fabricated. Thus, the additional process for forming the low-reflection layer is unnecessary because the silicon layer composing the thin film transistors 44 can be used together with the low-reflection layer 3*b*, which is an advantage of this embodiment.

Figure 6:
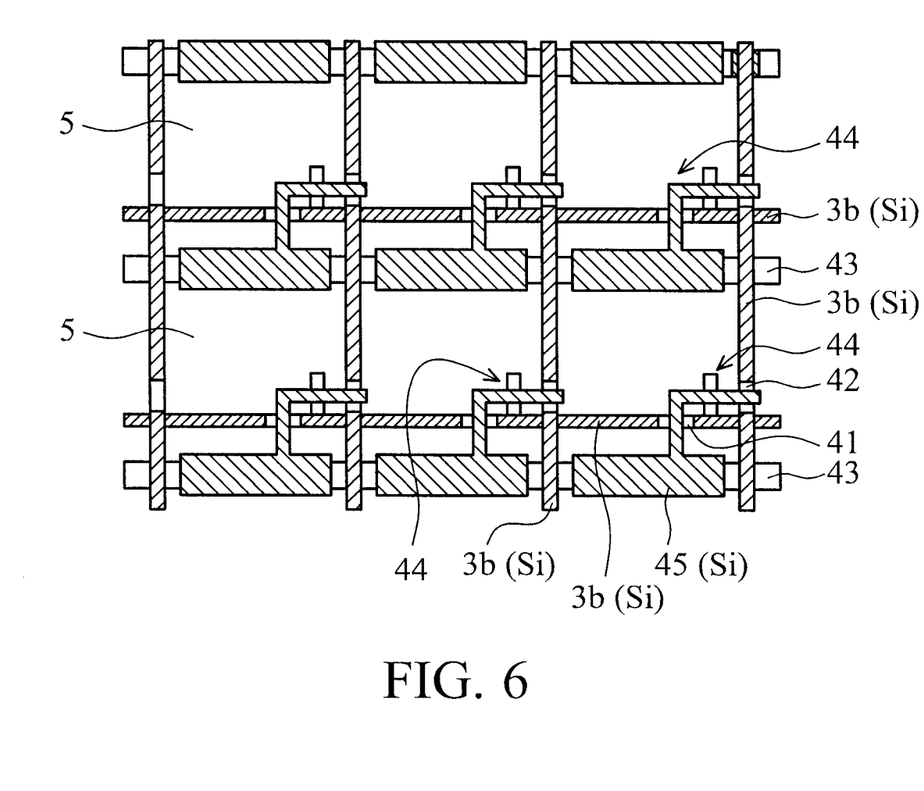
FIG. 6 shows a typical drawing of a physical relationship between the low-reflection layer and the wiring pattern of the bus line in the third embodiment of the invention.

FIG. 6 shows a layout of a physical relationship between the low-reflection layer 3*b* and the wiring pattern of the bus lines 3*b* in the third embodiment of the invention. In FIG. 6, the components which are the same as or similar with those shown in FIGS. 2A through 2C are represented by the same reference numerals and/or letters, and the descriptions thereof are omitted herefrom. The regions with fine hatchings extending from the upper-right to lower-left direction of FIG. 6 are formation regions of the low-reflection layer 3*b*. The regions with coarse hatchings extending from the upper-left to lower-right direction of FIG. 6 are polysilicon regions 45. An example, wherein the low-reflection layer 3*b* disposed to cover all of the bus lines 4*a* (the gate bus lines 41, the data bus lines 42, and capacitor bus lines 43) is shown in FIG. 6. The low-reflection layer 3*b* composed of the semiconductor film (silicon layer) is disposed overlying the upper side (front side) of all of the bus lines 4*a* beyond the patterned polysilicon regions 45 to fabricate the thin film transistors 44.

In the LCD device of the third embodiment, when the incident/ambient light enters from the front side of the liquid display panel 20 (the solid arrow E in FIG. 5), the incident/ambient light is shielded by the low-reflection layer 3*b* and does not arrive at the bus lines 4*a* because the low-reflection layer 3*b* is disposed overlying the bus lines 4*a*, which is similar with the first and second embodiments. Because the low-reflection layer 3*b* is formed by a semiconductor film with low optical reflectivity, the reflected light reflected by the low-reflection layer 3*b* is minimal (the dashed arrow F in FIG. 5). Thus, viewing properties of the liquid crystal panel 20 are not affected by the reflected light.

Fourth Embodiment

Figure 7:
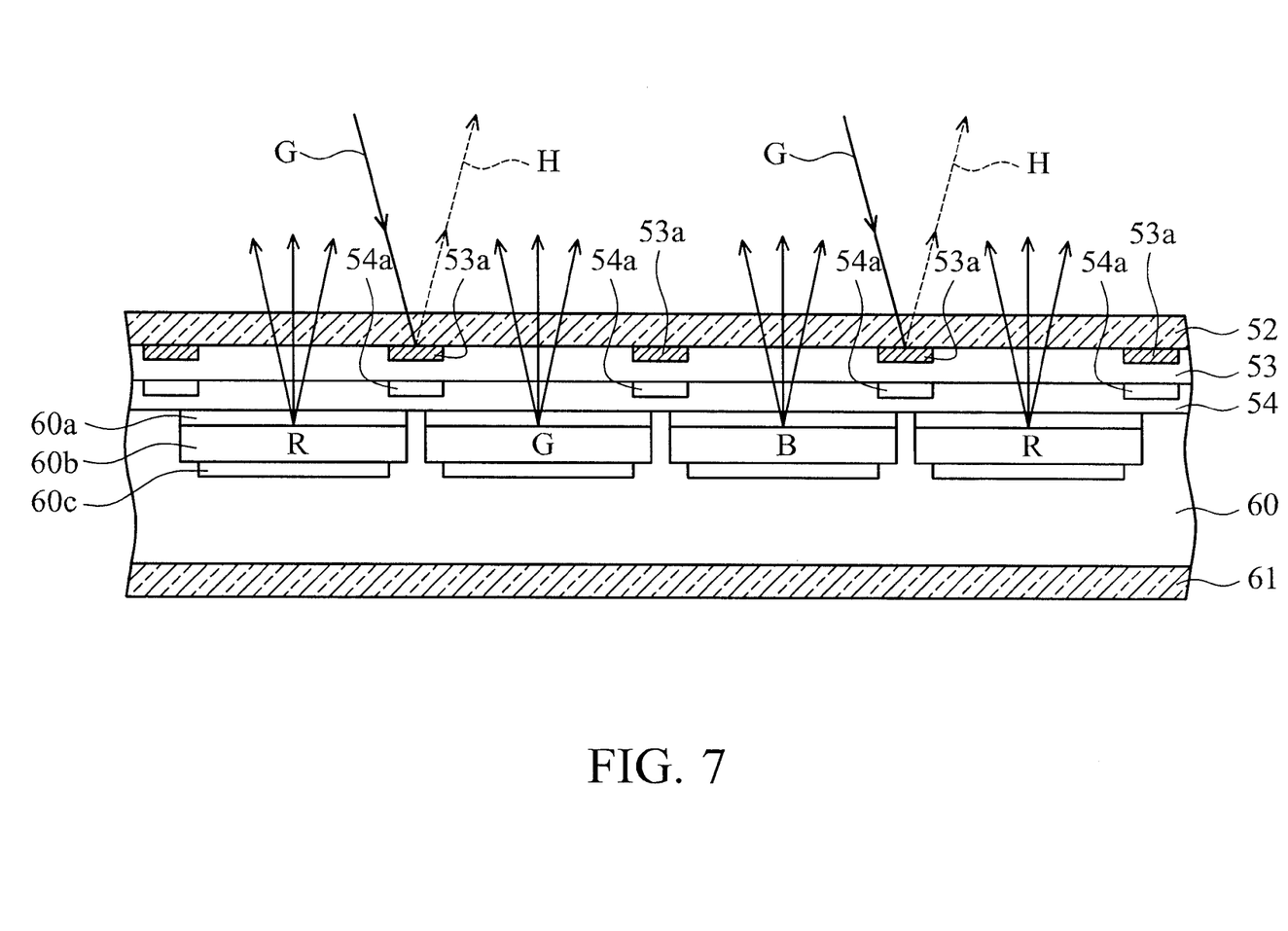
FIG. 7 shows a cross-sectional view of an organic light emitting diode (OLED) of a fourth embodiment of the invention.

FIG. 7 shows a cross-sectional view of an organic light emitting diode of a fourth embodiment of the invention. The organic light emitting diode comprises a glass substrate 52, a buffer film 53 where a layer 53*a* with low optical reflectivity (hereafter referred to as a "low-reflection layer 53*a*"), which is a characteristic of this embodiment of the invention, is disposed, an insulating film 54 where thin film transistors acting as control components and bus lines 54*a* are disposed, an insulating film 60 where pixel electrodes 60*a*, light emitting components 60*b* of R, G, B, and control electrodes 60*c* are disposed, and a glass substrate 61 sequentially laminated from a front (upper) side to a back (lower) side thereof.

The low-reflection layer 53*a* patterned with the same shape as that of the bus lines 54*a* is formed overlying the upper side (front side) of the buffer film 53. The low-reflection layer 53*a* is fabricated by metals with lower optical reflectivity than that of the bus lines 54*a* (gold alloys, for example). The low-reflection layer 53*a* is formed to cover the bus lines 54*a*, but does not cover the thin film transistor formation regions. The low-reflection layer 53*a* does not electrically connect to the bus lines 54*a*.

In the organic light emitting diode of the fourth embodiment, when the incident/ambient light enters from the front side thereof (the solid arrow G in FIG. 7), the incident/ambient light is shielded by the low-reflection layer 53*a* and does not arrive at the bus lines 54*a* because the low-reflection layer 53*a* is disposed overlying the bus lines 54*a*. Because the low-reflection layer 53*a* is foamed by metal with low optical reflectivity, the reflected light reflected by the low-reflection layer 53*a* is minimal (the dashed arrow H in FIG. 7). Thus, viewing properties of the display device are not affected by the reflected light.

Fifth Embodiment

Figure 8:
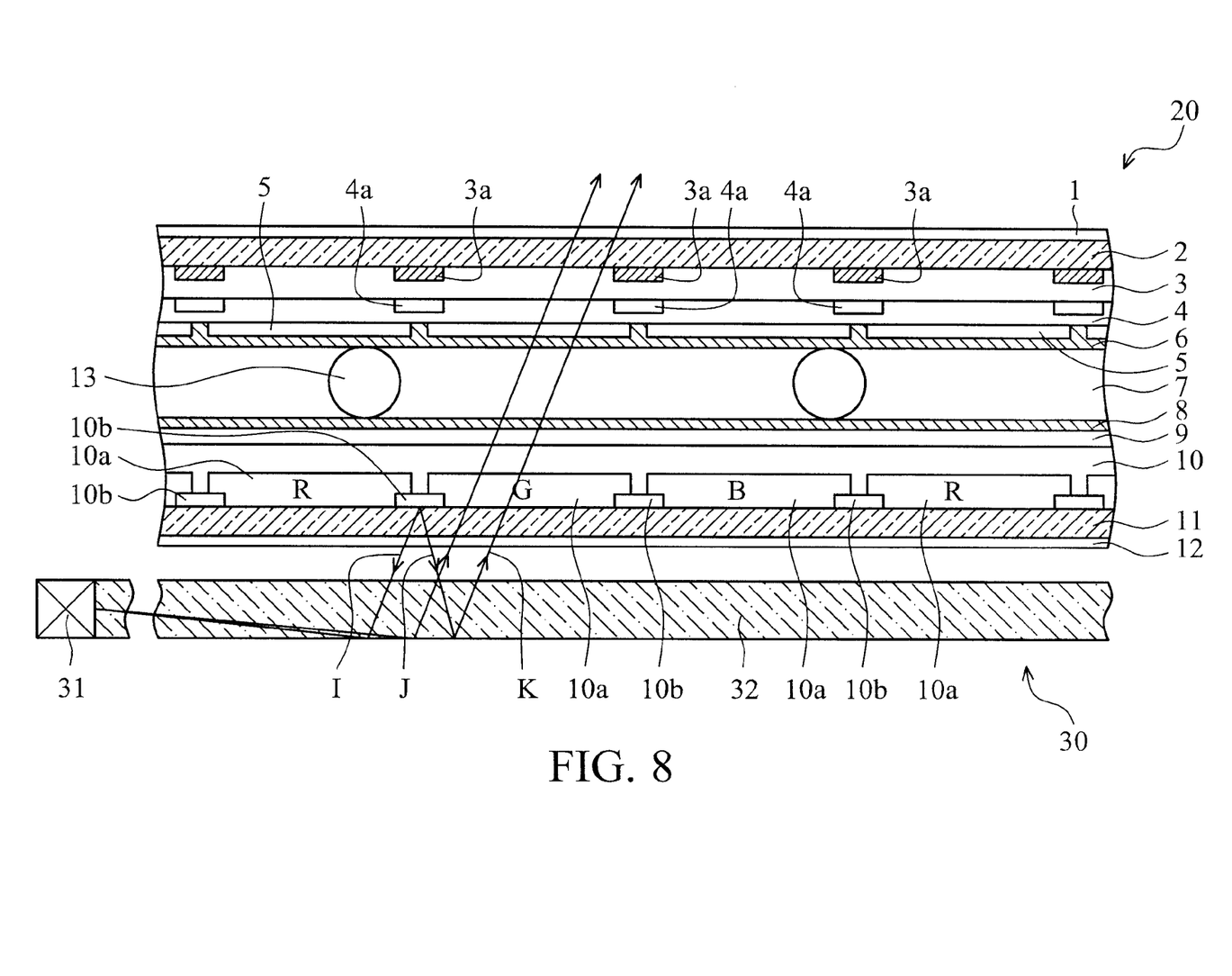
FIG. 8 shows a cross-sectional view of an LCD device of a fifth embodiment of the invention.

FIG. 8 shows a cross-sectional view of an LCD device of a fifth embodiment of the invention. In FIG. 8, the components which are the same as or similar with those shown in FIG. 1 are represented by the same reference numerals and/or letters, and the descriptions thereof are omitted herefrom. In the fifth embodiment, the black matrix 10*b* comprises a layered structure material with good performance for light reflection, and the black matrix 10*b* comprises a light-diffusing surface.

The light (the arrow I of FIG. 8) guided from the backlight device 30 to the liquid crystal panel 20 is reflected by the black matrix 10*b*. Because the surface of the black matrix 10*b* has a light diffusing property, the reflected light is scattered and then the polarizing condition thereof is destroyed. Thus, the reflected light (the arrow J of FIG. 8) is not absorbed by the polarizer film 12. As a result, the reflected light is reflected by the backlight device 30 (light guide plate 32), and then guided to the liquid crystal panel 20 again The guided light (arrow K of FIG. 8) passes the apertures and arrives at the viewing side of the liquid crystal panel.

According to the described fifth embodiment, the light illuminating the black matrix 10*b* can be used for viewing images. Thus, it is possible to output more illumination than that corresponding to the aperture rate, thereby increasing optical transmittance of the panel.

While the invention has been described by way of example and in terms of preferred embodiment, it is to be understood that the invention is not limited thereto. To the contrary, it is intended to cover various modifications and similar arrangements (as would be apparent to those skilled in the Art). Therefore, the scope of the appended claims should be accorded the broadest interpretation so as to encompass all such modifications and similar arrangements.

What is claimed is:

1. A display device, comprising:
   an array substrate having a control component, a bus line on a surface, and a low-reflection layer with an optical reflectivity lower than that of the bus line, wherein the control component corresponds to each of pixels to control luminance for displaying images, the bus line is for operating the control component, and the low-reflection layer covers the bus line but does not cover the control component;
   a color filter substrate having a plurality of color filters arranged in a matrix, and a black matrix disposed between neighboring color filters; and
   a backlight device, wherein the color filter substrate is disposed between the array substrate and the backlight device.

2. The device as claimed in claim 1, further comprising:
   a smoothing film for smoothing the surface of the array substrate, wherein the low-reflection layer is formed at a side close to the array substrate of the smoothing film.

3. The device as claimed in claim 2, wherein
   the control component is a thin film transistor (TFT); and the bus line comprises at least one of a data bus line connected to the thin film transistor, a gate bus line connected to the thin film transistor, and a bus line for a storage capacitor.

4. The device as claimed in claim 1, wherein the control component is a thin film transistor (TFT); and the bus line comprises at least one of a data bus line connected to the thin film transistor, a gate bus line connected to the thin film transistor, and a bus line for a storage capacitor.

5. The device as claimed in claim 1, wherein the low-reflection layer is a metal film or a laminated film of a metal film and a metal oxide film.

6. The device as claimed in claim 1, wherein the low-reflection layer is a resin film.

7. The device as claimed in claim 1, wherein the low-reflection layer is a semiconductor film.

8. The device as claimed in claim 1, wherein the black matrix comprises a light diffusing surface.

* * * * *